E. ASCUE.
SHEEP SHEARS.
APPLICATION FILED JUNE 11, 1909.
958,069.
Patented May 17, 1910.
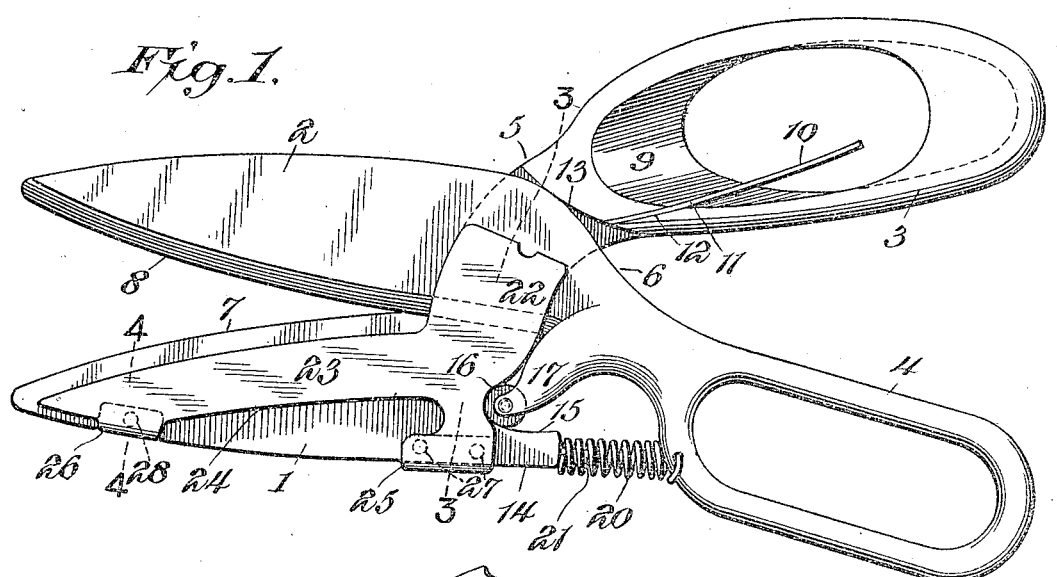
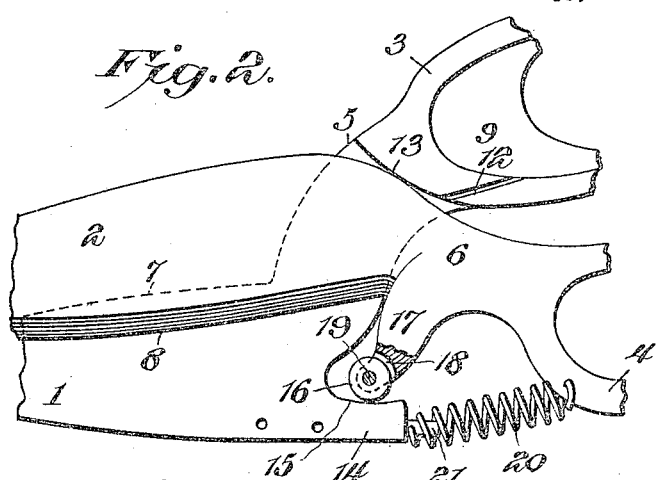
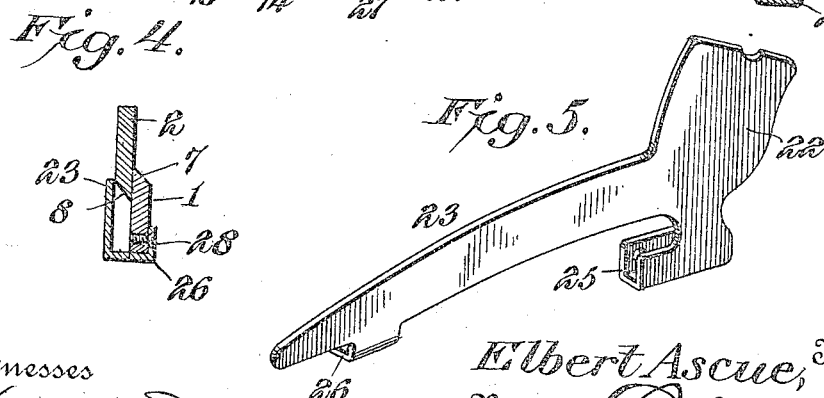
Witnesses
Howard D. Orr
H. F. Riley
Elbert Ascue, Inventor,
By E. G. Siggers
Attorney

UNITED STATES PATENT OFFICE.

ELBERT ASCUE, OF BLUM, TEXAS, ASSIGNOR OF ONE-THIRD TO RICHARD H. CRANK, OF CLEBURNE, TEXAS.

SHEEP-SHEARS.

958,069. Specification of Letters Patent. Patented May 17, 1910.

Application filed June 11, 1908. Serial No. 437,899.

*To all whom it may concern:*

Be it known that I, ELBERT ASCUE, a citizen of the United States, residing at Blum, in the county of Hill and State of Texas, have invented a new and useful Sheep-Shears, of which the following is a specification.

The invention relates to improvements in scissors and shears.

The object of the present invention is to improve the construction of scissors and shears, more especially sheep shears, and to provide a simple and comparatively inexpensive construction having means for preventing a pair of scissors or shears from cutting, lacerating or otherwise injuring the skin or pelt of a sheep or other animal, whereby the same may be sheared with greater rapidity than heretofore.

A further object of the invention is to provide a pair of shears of this character, adapted to be easily taken apart for grinding.

Another object of the invention is to provide shears having yieldable means to be grasped by the operator to cushion the hand and to enable the shears to be more easily operated and to avoid cramping the thumb and fingers.

The invention also has for its object to dispense with the pivot of shears without affecting their efficiency, and to enable the members of the shears to be readily separated for grinding.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a plan view of the sheep shears, constructed in accordance with this invention. Fig. 2 is an enlarged detail view of a portion of the shears, the guard being removed. Fig. 3 is a transverse sectional view, taken substantially on the line 3—3 of Fig. 1. Fig. 4 is a similar view, taken substantially on the line 4—4 of Fig. 1. Fig. 5 is a detail perspective view of the guard.

Like numerals of reference designate corresponding parts in all the figures of the drawing.

The sheep shears comprise two members, adapted to be operated in the usual manner and consisting of blades 1 and 2 and handles 3 and 4, connected with the inner ends of the blades by narrow connecting portions or shanks 5 and 6. The blades 1 and 2 are provided with inner cutting edges 7 and 8, and the handle 3 of the blade 1 which is designed to receive the thumb of the operator, has a substantially oblong opening and is provided at its inner end with a thumb receiving recess 9. The outer end of the handle is recessed at the opposite face to fit the wrist and inner portion of the hand.

In order to enable the shears to be easily operated with less fatigue and liability of cramping the hand than heretofore, the handle 3 is equipped with a cushioning spring 10, extending longitudinally of the inner side of the handle 3 and arranged to receive the thumb, and having its front attached portion 11 secured in a groove 12 of the handle 3 at the inner side of the inner end thereof, as clearly illustrated in Fig. 1 of the drawing. The free portion of the spring is spaced from the opposite walls of the opening so as to yield in either direction, and it forms a cushion for the thumb and relieves the thumb and fingers of strain and facilitates a rapid operation of the shears. The handle 4 is provided with an oblong opening of the usual form for the reception of the fingers of the operator.

The handle 3 is provided at its inner end with a shoulder 13, located at the adjacent end of the neck or connecting shank 5 and forming a stop, arranged to be engaged by the blade 2 for limiting the opening movement of the shears. The blade 1, which is connected with the handle 3, is provided at the back with a rearward extension 14 having an arcuate inner edge 15, adapted to receive an anti-friction wheel 16 of an arm 17, extending outwardly from the shank or connecting portion 6 of the blade 2. The arm, which extends laterally and outwardly from the outer side of the shank or connecting portion 6, is provided in its outer end with slots or bifurcations 18 to receive the anti-friction wheel 16, which is mounted on a suitable pivot 19. The anti-friction device of the arm 17 is maintained in contact with the arcuate edge of the extension 14 of the blade 1 by means of a coiled spring 20, which also serves to open the blade automatically. The extension 14 is formed by recessing the rear portion of the blade 1, as clearly illustrated in Fig. 2 of the drawing, and the extension 14 terminates in a stud 21 to which the inner end of the spring 20 is secured. The outer end of the spring is secured to the handle 4 adjacent to the inner end thereof and is contracted and under a slight tension when the blades are open, as illustrated in Fig. 1 of the drawing. When the blades are closed by compressing the handles together, the spring is distended, as illustrated in Fig. 2 of the drawing, and it operates to open the blades and the handles automatically as soon as the latter are permitted to move. The stud 21 and the handle 4 are preferably provided with perforations to detachably receive the terminal portions of the coiled spring 20, but the latter may be connected with the said parts in any other desired manner.

The shanks or portions 5 and 6, which connect the blades with the handles, are maintained flat against each other by means of a transversely disposed arm 22 of a guard 23. The guard 23, which is constructed of sheet metal, or other suitable material, is arranged in spaced relation with and is mounted on the blade 1, and it coöperates with the blade to form a groove for the reception of the cutting edge 8 of the other blade 2. The shield is located next to the animal while shearing the same, and it effectually prevents the cutting edges of the blade from coming in contact with the skin or pelt of the animal. The skin or pelt is thereby protected from being cut or otherwise injured, and the operator is enabled to use the shears more rapidly than those not equipped in this manner. The guard 23, which extends longitudinally of the blade, has its inner edge located slightly in rear of the inner cutting edge 7 of the blade 1, and it is cut away at the outer edge at 24 to provide an open space to permit the escape of particles of wool and dirt to prevent the guard from becoming clogged. The arm 22, which is disposed transversely of the shears, extends from the inner side of the guard, and it is arranged in spaced relation with the shank or portion 5 and coöperates with the same to form a way for the shank 6. The spring by drawing the handle 4 forward relative to the other handle, maintains the blades in proper coöperative position for cutting. When the spring is disconnected from the handle 4, the two members of the shears may be readily separated by withdrawing the blade 2 from the opening or way formed by the shank 5 and the arm 22.

The guard is provided at its outer side with inner and outer attaching portions or flanges 25 and 26, which are approximately L-shaped. These flanges 25 and 26 have portions extending inwardly on the outer face of the blade 2 and secured to the same by screws 27 and 28, which permit the guard to be readily removed when desired. The guard is adapted to be removed to enable it to be ground as the blade 2 is ground, so as to maintain its inner edge in proper position with relation to the cutting edge 7 of the blade 1. Any other suitable means, however, may be employed for mounting the support on the blade 2, and by eliminating the body portion of the guard and by retaining the arm 22 and the inner attaching flange 25, an efficient pair of pivotless scissors is provided. The guard may be applied to ordinary scissors or shears, and will enable the same to be rapidly operated without cutting the hide or pelt of the animal.

Having thus fully described my invention, what I claim as new and desire to secure by Letters Patent, is:—

1. Shears including a handle having an opening and provided with a spring mounted on the handle and having a movable cushioning portion extending from the handle at the opening and located at an intermediate point between the opposite walls thereof so as to spring in either direction to cushion the hand of the operator.

2. Shears including a handle having a substantially oblong opening and provided with a spring mounted on the handle and extending longitudinally of the opening in spaced relation with the walls thereof and arranged to receive and cushion the hand of the operator.

3. Shears including a handle having an opening, and a spring secured at one end to such handle and having a free portion arranged within the said opening and extending longitudinally of the handle and forming a cushion for the operator.

4. Shears including a handle provided with an opening and having a groove, and a spring secured at one end in the groove and having a free portion extending into the opening and forming a cushion for the operator.

5. Shears including a thumb receiving handle having an opening and provided at the inner end with a recess and having a groove formed in the inner end of the handle at the inner side thereof, and a spring secured at one end in the groove and having a free portion arranged in the opening of the handle to receive the thumb of the operator.

6. Shears including two pivotless members having outer blades and inner handles and provided with intermediate connecting portions, and a guard secured intermediate of its ends to the blade of one of the members and having an arm at its inner end arranged in spaced relation with the intermediate portion of such member and coöperating therewith to form a way, the other member being longitudinally movable in the way, in the operation of the shears.

7. Shears including two pivotless members having outer blades and inner handles, and a guard extending longitudinally of the blade of one of the members and provided at spaced points with angular attaching portions embracing and secured to the said blade at the outer edge thereof, said guard being provided at its inner end with an arm arranged in spaced relation with the member to which the guard is secured and coöperating therewith to form a way for the reception of the other member, which is movable longitudinally in the said way in the operation of the shears.

8. Shears including two members having outer blades and inner handles and provided with intermediate shanks or connecting portions, and a guard extending along and secured to one of the blades and provided at its inner end with a transversely disposed arm arranged in spaced relation with the shank or connecting portion thereof for holding the blades in coöperative relation, and a spring connected with the members for maintaining the cutting edges of the blades in proper position for cutting.

9. Shears including two oscillatory members provided with blades and having handles connected with the inner ends of the same, one of the blades being provided at its inner end with a curved edge, an anti-friction device mounted on the other member and arranged to run on the said curved edge, and a spring for holding the blades normally open and for maintaining the anti-friction device in engagement with the said edge.

10. Shears including two members having outer blades and inner handles and provided with intermediate shanks or connecting portions, a transversely disposed arm mounted on one of the members and arranged in spaced relation with the shank or connecting portion thereof for holding the blades in coöperative relation, and a spring connected with the members for holding the blades normally open and for maintaining their cutting edges in proper relative position.

11. Shears including two members having outer blades and inner handles and provided with intermediate shanks or connecting portions, a transversely disposed arm mounted on one of the members and arranged in spaced relation with the shank or connecting portion thereof for holding the blades in coöperative relation, and a spring connected with the members for holding the blades normally open and for maintaining their cutting edges in proper relative position, said spring being detachably connected with the said members and permitting a separation of the same.

12. Shears including oscillatory members provided with outer blades and having inner handles connected with the blades, one of the blades being provided at its inner end with an extension, an anti-friction device carried by the other member and arranged to engage the said extension, and a spring connected with the extension and with the handle of the other member.

13. Shears including oscillatory members provided with outer blades and having inner handles connected with the blades, one of the blades being provided at its inner end with an extension, an arm projecting from the other member, an anti-friction wheel mounted on the said arm and engaging the said extension, and a spring connecting the members for holding the blades normally open and for maintaining the anti-friction wheel in engagement with the said extension.

14. Shears including two oscillatory members having outer blades and provided with inner handles, one of the blades being provided at its inner end with an extension, an arm projecting from the other member and having means for engaging the said extension, a guard secured to the blade having the said extension and overlapping the other blade for maintaining the members in spaced relation, and a spring connected with the said extension and with the handle of the other member.

15. Shears including two members provided with outer blades and having inner handles, one of the members being provided at the inner end of its handle with a shoulder, a transversely disposed arm mounted on such member and overlapping the other member for maintaining the same in spaced relation, a spring detachably connected with the members for maintaining the cutting edges of the blades in proper relative position, said spring being detachable and the members being separable from each other when the spring is detached.

In testimony, that I claim the foregoing as my own, I have hereto affixed my signature in the presence of two witnesses.

ELBERT ASCUE.

Witnesses:
J. B. LONG,
D. G. SELLS.